E. H. ANGLE.
DENTAL PLIERS.
APPLICATION FILED MAR. 26, 1915.
1,177,223.
Patented Mar. 28, 1916.
FIG. 1.
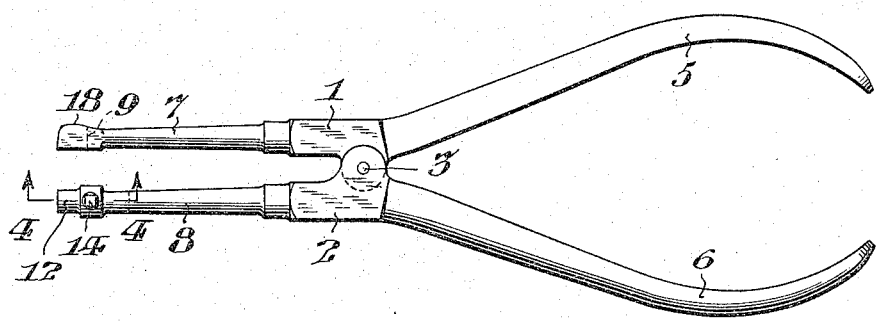
FIG. 2.
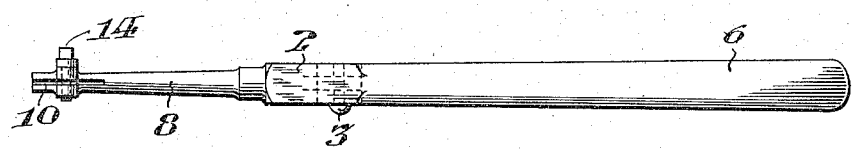
FIG. 3. FIG. 5.
FIG. 4.
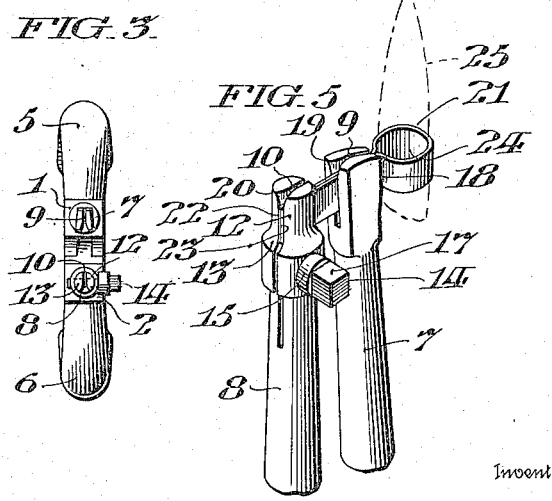
Inventor
Edward H. Angle,
By
Clifton C. Callowell
Attorney
Witnesses
Edward F. Simpson, Jr.
William J. Russell

E. H. ANGLE.
DENTAL PLIERS.
APPLICATION FILED MAR. 26, 1915.

1,177,223.

Patented Mar. 28, 1916.
2 SHEETS—SHEET 2.

Witnesses
Edward F. Simpson, Jr.
William J. Russell

Inventor
Edward H. Angle,
By Clifton C. Hallowell
Attorney

THE COLUMBIA PLANOGRAPH CO., WASHINGTON, D. C.

UNITED STATES PATENT OFFICE.

EDWARD H. ANGLE, OF NEW LONDON, CONNECTICUT.

DENTAL PLIERS.

1,177,223.  Specification of Letters Patent.  Patented Mar. 28, 1916.

Application filed March 26, 1915. Serial No. 17,136.

*To all whom it may concern:*

Be it known that I, EDWARD H. ANGLE, a citizen of the United States, and a resident of New London, in the county of New London and State of Connecticut, have invented certain new and useful Improvements in Dental Pliers, of which the following is a specification, reference being had to the accompanying drawings.

My invention relates particularly to that class of dental pliers which are designed for use in connection with the art of orthodontia, and is directed especially to means for applying a tooth-band to a tooth to which it may be subsequently attached, for the purpose of regulating or correcting the dental arch.

In the art of orthodontia it is highly essential that the tooth-band shall be drawn extremely taut around the tooth to which it is to be adapted, and to be caused to accurately conform thereto, and as the metal of which tooth-bands are composed is rare and consequently expensive, it is desirable that the strips forming the bands may be as short as possible to avoid waste.

The principal object of my invention is, to provide pliers which are arranged to hold the strip forming the tooth-band while being applied thereto, and to so adapt it to a tooth as to cause it to accurately conform to the circumferential surface thereof to form a snug-fitting collar.

Specifically stated, my invention comprehends a pair of pliers having means for forming a slip-noose around a tooth, and exerting such tensional strain on the strip forming the noose as to cause it to conform to the tooth to which it is applied.

My invention also includes all of the various novel features of construction and arrangement hereinafter more definitely specified.

Figure 6:
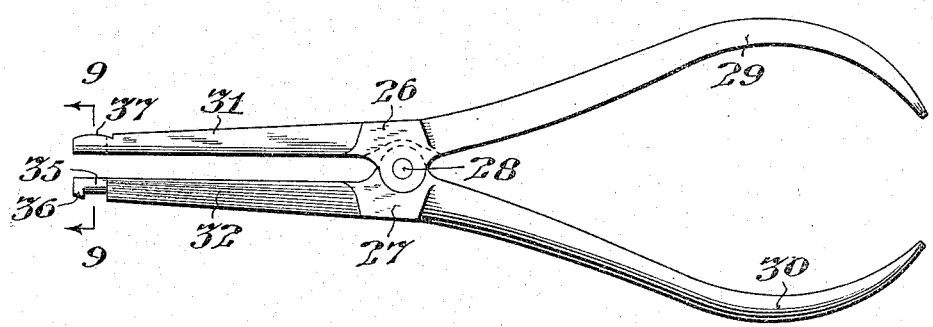
Figure 7:
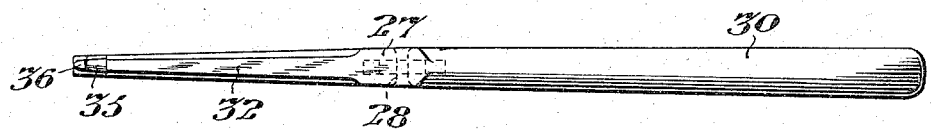
Figure 9:
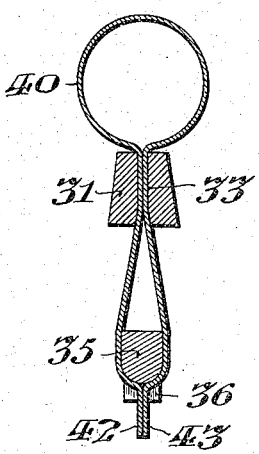
Figure 8:
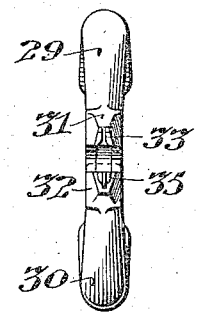
Figure 10:
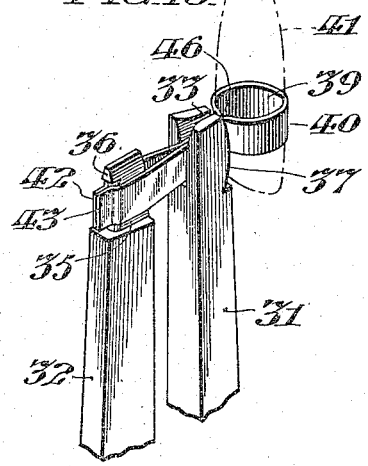

In the accompanying drawings, Figure 1 is a plan view of a pair of pliers conveniently embodying my invention; Fig. 2 is a side elevational view of the pliers shown in Fig. 1, as viewed from the lower side of said figure; Fig. 3 is an end elevational view of said pliers as viewed from the forward end at the left of Fig. 1; Fig. 4 is a longitudinal sectional view of the forward ends of one of the beaks of the pliers shown in Fig. 1, taken on the line 4—4 in said figure; Fig. 5 is a fragmentary perspective view, showing the forward ends of the beaks of said pliers, holding a band in position to adapt it to a tooth; Fig. 6 is a plan view of a modification of the pliers shown in Figs. 1 to 5, inclusive; Fig. 7 is a side elevational view of the pliers shown in Fig. 6, as viewed from the lower side of said figure; Fig. 8 is an end elevational view, as viewed from the forward end at the left of Fig. 6; Fig. 9 is a transverse sectional view, taken through the forward end of the beaks of the pliers, on the line 9—9 in Fig. 6, and showing in section a tooth-band held thereby; and Fig. 10 is a fragmentary perspective view of the forward ends of said beaks, showing the band held thereby in position to be adapted to a tooth.

In the form of my invention shown in Figs. 1 to 5, inclusive, the relatively movable body members 1 and 2, forming the pliers, are pivoted at 3 and respectively have the rearwardly extending handles 5 and 6 and the forwardly extending opposed beaks 7 and 8, which are provided with slots or slits 9 and 10 respectively, preferably disposed in transverse alinement with each other, as best shown in Fig. 5. The free end of the beak 8 is bifurcated by the slit 10, which extends well up into said beak so that the bifurcations 12 and 13 thus formed may be relatively adjusted with respect to each other by the set-screw 14, whose head 15 bears against the bifurcation 12, and whose threaded shank 16 extends loosely through said bifurcation 12 and into threaded engagement with the bifurcation 13 to form a clamp or vise, as best shown in Fig. 4. The set-screw 14 may be provided with the squared extension 17 for the purpose of rotating it by a suitably formed wrench, or it may be provided with well known thumb-engaging means (which need not be here shown), whereby it may be rotated without the use of a wrench, to draw the bifurcations 12 and 13 together to clamp the tooth-band, as hereinafter described.

As best shown in Figs. 1 and 5, the outer wall 18 of the beak 7, adjacent to the free end of said beak, is curved to facilitate its contouring action upon the tooth-band hereinafter described.

As best shown in Fig. 5, the slit 9 is broadened toward the forward inner corner 19 of the beak 7, and the slit 10 is broadened toward the forward outer corner 20 of the beak 8, which facilitates the insertion in said slits of the strip forming the tooth-band 21, which has its ends 22 and 23 brought together to form the bight 24 embracing the tooth 25, shown in dot and dash lines, and extended through the slit 9 with its extreme ends clamped between the bifurcations 12 and 13 by the set-screw 14.

It will be obvious from an inspection of Fig. 1 of the drawings, that the action of pressing together the handles 5 and 6 by the operator will tend to separate the beaks 7 and 8, so that when the strip forming the tooth-band 21 is extended through the slit 9 and has its ends engaged with the beak 8, it will substantially form a slip-noose which may embrace the tooth 25 and be caused to conform thereto by the movement of the beak 7 away from the beak 8, which movement tends to close the noose or bight forming the band 21 around the tooth 25 to form a collar, which may, after being caused to conform to the tooth, be removed and clipped, by any form of shears, from that portion of the strip extending through the slits 9 and 10, and have its ends soldered together and be subsequently attached to said tooth 25 for the purpose desired.

In the form of my invention shown in Figs. 6 to 10, inclusive, the relatively movable members 26 and 27 forming the pliers are pivoted at 28, and respectively have the rearwardly extending handles 29 and 30, and the forwardly extending opposed beaks 31 and 32, the beak 31 being provided with a slit 33, and the beak 32 being provided with a band-engaging member 35 provided with an overhanging hook-like projection 36, to prevent the band from slipping off the end thereof, as best shown in Fig. 10.

As shown in Figs. 6 and 10, the outer wall 37 of the beak 31, adjacent to its free end, is curved, extending slightly beyond the slit 33 and arranged to bear against the bight 39 of the tooth-band 40, which embraces the tooth 41, shown in dot and dash lines, and which has the ends 42 and 43 of the strip forming the band, soldered together, so that said strip thus closed may be hooked over the member 35 on the beak 32 and passed through the slit 33 in the beak 31, so that when the handles 29 and 30 are pressed together, the beaks 31 and 32 will tend to separate and draw the strip forming the tooth-band, through the slit 33 to tighten the slip-noose 46 embracing the tooth 41, as best shown in Fig. 10.

It will be readily seen that the curved wall 37 will be especially advantageous in forming the tooth-band into the bite of the tooth, so that the collar thus formed may accurately conform to the tooth, and when thus shaped the tooth-bands may be removed from the tooth and that portion forming the collar clipped from that portion of the strip forming the band which extends through the slit 33 and around the member 35, and the ends formed by such separation soldered to form the closed collar or band.

The pliers constructed in accordance with my invention are advantageous in that they not only hold the tooth-band in position to be adapted to the teeth of the dental arch, but comprise means which cause the said tooth-band to conform to the shape of the tooth to which said band is to be applied, and therefore eliminates the necessity of the use by the operator of separate tools, one for holding the band and the other for forming it around the tooth.

I do not desire to limit my invention to the precise details of construction and arrangement herein set forth, as it is obvious that various modifications may be made therein without departing from the essential features of my invention as defined in the appended claims.

Having thus described my invention, I claim:

1. A pair of pliers having opposed beaks, one being provided with a transverse slit, and the other having means for holding a tooth-band and exerting tension thereon in the plane of said slit, to draw it therethrough.

2. A pair of pliers having opposed beaks, one being bifurcated, and the other having a clamp for holding a strip in position to be drawn thereby between the bifurcations.

3. A pair of pliers having opposed beaks provided with alined slits extending inwardly through the free ends thereof, and having means for binding a strip in one of said slits whereby the separation of said beaks effects the drawing of said strip through the slit in the other beak.

4. A pair of pliers having opposed beaks, one being provided with a slit and having its outer wall curved longitudinally of said slit, and the other having means for engaging the opposite ends of a strip forming a tooth-band and drawing it through said slit.

5. A pair of pliers having relatively movable beaks, each having its free end bifurcated, one of said beaks having a set-screw for relatively adjusting the bifurcations to clamp the free ends of a tooth-band, whereby said tooth-band may be drawn between the bifurcations of the other beak.

In witness whereof, I have hereunto set my hand this 24th day of March, A. D., 1915.

EDWARD H. ANGLE.

Witnesses:
WILLIAM BELCHER,
NATHAN BELCHER.